(12) United States Patent
Gollier et al.

(10) Patent No.: US 11,086,126 B1
(45) Date of Patent: Aug. 10, 2021

(54) DISTRIBUTED ARTIFICIAL REALITY SYSTEM WITH A REMOVABLE DISPLAY

(71) Applicant: Facebook Technologies, LLC, Menlo Park, CA (US)

(72) Inventors: Jacques Gollier, Redmond, WA (US); Ying Geng, Sammamish, WA (US); Yusufu Njoni Bamaxam Sulai, Bothell, WA (US); Brian Wheelwright, Sammamish, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/979,019

(22) Filed: May 14, 2018

(51) Int. Cl.
- G02B 27/01 (2006.01)
- G06F 1/16 (2006.01)
- G06T 19/00 (2011.01)
- G06F 3/01 (2006.01)

(52) U.S. Cl.
CPC ......... *G02B 27/0172* (2013.01); *G06F 1/163* (2013.01); *G06F 1/1635* (2013.01); *G06F 1/1654* (2013.01); *G06F 3/011* (2013.01); *G06F 3/017* (2013.01); *G06T 19/006* (2013.01); *G02B 2027/0178* (2013.01)

(58) Field of Classification Search
CPC ........ G02B 27/0172; G02B 2027/0178; G06F 3/017; G06F 1/1635; G06F 1/163; G06F 1/1654; G06F 3/011; G06T 19/006
See application file for complete search history.

(56) References Cited

U.S. PATENT DOCUMENTS

| | | | |
|---|---|---|---|
| 9,465,216 B2* | 10/2016 | Park .................... | G02B 27/017 |
| 2008/0169998 A1* | 7/2008 | Jacobsen ............ | G02B 27/0172 |
| | | | 345/8 |
| 2011/0080339 A1* | 4/2011 | Sun ..................... | G06F 3/017 |
| | | | 345/157 |
| 2014/0043212 A1* | 2/2014 | Park .................... | G02B 27/017 |
| | | | 345/8 |
| 2017/0068105 A1* | 3/2017 | Yun .................... | G02B 5/3025 |
| 2019/0041642 A1* | 2/2019 | Haddick ............. | G02B 27/0075 |
| 2020/0050861 A1* | 2/2020 | Wexler ............... | G06K 9/00355 |

OTHER PUBLICATIONS

U.S. Appl. No. 15/487,361, filed Apr. 13, 2017, Inventors: Christopher David Twigg et al.
U.S. Appl. No. 15/644,203, filed Jul. 7, 2017, Inventor: Nicholas Daniel Trail.
U.S. Appl. No. 15/372,779, filed Dec. 8, 2016, Inventor: Nicholas Daniel Trail.
U.S. Appl. No. 15/335,807, filed Oct. 27, 2016, Inventors: Jacques Gollier et al.
U.S. Appl. No. 15/624,439, filed Jun. 15, 2017, Inventors: Jacques Gollier et al.
U.S. Appl. No. 15/179,883, filed Jun. 10, 2016, Inventors: Jacques Gollier et al.

* cited by examiner

*Primary Examiner* — Kenneth Bukowski

(74) *Attorney, Agent, or Firm* — Fenwick & West LLP

(57) ABSTRACT

A system includes an eyewear device, and a neckband device. The neckband device includes a power source and a processor communicatively coupled to the eyewear device. The system includes a bracelet device, which includes at least one sensor configured to determine a position signal in response to movement of the user's hand, the bracelet device communicatively coupled to the processor. A display device is configured to present content to a user, and is also configured to couple to and be removable from the eyewear device.

18 Claims, 4 Drawing Sheets

DISTRIBUTED ARTIFICIAL REALITY SYSTEM WITH A REMOVABLE DISPLAY

BACKGROUND

The present disclosure generally relates to a distributed artificial reality system, and specifically to the use of a removable display that interfaces with a number of devices in the distributed artificial reality system.

Augmented reality (AR) systems and environments allow a user to directly or indirectly view a real world environment augmented by generated sensory input, which may be superimposed on the real world environment. Sensory input can be any form of media, such as sound, video, graphics, etc. Typically, an AR system includes a headset that provides visual and audio information to the user. Because AR systems allow for users to continue to engage with their real world environments in addition to a generated one, users may have less tolerance for large AR headset devices, as opposed to a virtual reality (VR) system in which the user is typically immersed in a fully generated environment. Additionally, smaller form factors facilitate all-day or longer use of artificial reality systems by reducing the friction between a user's experience of his or her environment and the artificial reality system itself.

Conventional headset devices provide a visual component of an AR environment to a user through a display within the headset device. However, in conventional headset devices, the headset may only be used as an AR display, and the visual component of an AR environment may be limited to the headset device.

SUMMARY

A distributed system includes a removable display that provides visual content to a user. The removable display is one of several devices in a distributed artificial reality system, which combines sensing, processing and power storage across multiple devices. Other devices in the distributed system include a bracelet, an eyewear device and a neckband device. The removable display allows a user to view visual content in conjunction with any of the devices, and additionally allows the eyewear device to be used without an electronic display element. The artificial reality may be adjusted in response to the user's hand motion.

A system includes an eyewear device, and a neckband device. The neckband device includes a power source and a processor communicatively coupled to the eyewear device. The system includes a bracelet device, which includes at least one sensor configured to determine a position signal in response to movement of the user's hand, the bracelet device communicatively coupled to the processor. A display device is configured to present content to a user, and is also configured to couple to and be removable from the eyewear device.

Figure 1:
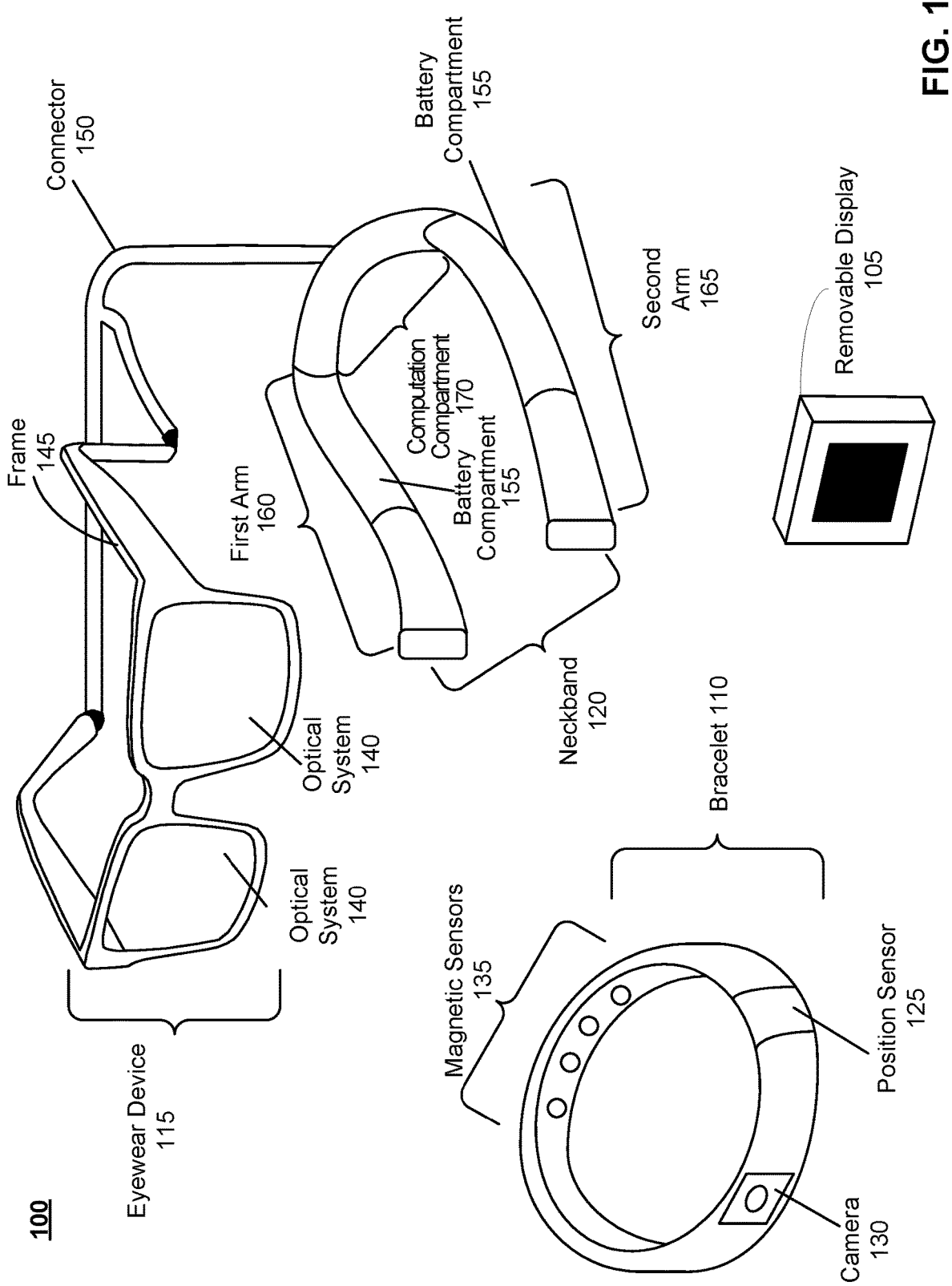
FIG. 1 is a diagram of a distributed artificial reality system, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

AR and/or mixed reality (MR) devices allow a user to directly or indirectly view a real world environment augmented by generated sensory input, such as sound, video, graphics, etc. The generated sensory input may be superimposed on the real world environment, allowing the user to interact with both simultaneously. To allow the user to continue to view and interact with his or her real world environment while also perceiving the augmented environment, AR devices ideally provide a minimally invasive interface for the user that can be easily worn for long periods of time without interfering with the user's interactions with the environment. One category of AR, virtual reality (VR), and/or MR device designs includes a near-eye display (NED) with optical elements that provide the user with generated visual input such as graphics or video. A NED may be imbedded in an eyewear device in the form of eyeglasses, which rest on the bridge of a user's nose. However, to accommodate the reduced form factor of the NED as a pair of eyeglasses, computation, battery, and additional functions are moved off of the NED and onto separate linked devices. The result is a distributed AR system of multiple independent devices that together provide a full AR experience for the user.

In addition to small form factors, a user may be encouraged to wear a distributed artificial reality system if the devices are able to switch between an artificial reality function and a non-media function. For example, if a user wishes to end an artificial reality experience, it is more convenient to continue wearing the artificial reality device and switch to a non-artificial reality experience, rather than fully remove the device. One way to switch between artificial and non-artificial reality is to incorporate a removable display device into an NED, which allows a user to remove a visual component of the artificial reality, and also gives flexibility for the display to be incorporated with other devices within the distributed artificial reality system.

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewer.

FIG. 1 is a diagram of a distributed artificial reality system 100, in accordance with one or more embodiments. The distributed artificial reality system 100 includes a number of different devices that together distribute the creation of an artificial reality.

Removable Display

The removable display 105 provides visual content to a user, and thus provides a visual component of an artificial reality environment. The removable display 105 may be an electronic display of light-emitting diodes (LEDs), organic LEDs (OLEDs), a liquid crystal display (LCD), an active-matrix organic light-emitting diode display (AMOLED), some type of flexible display, or some combination thereof. The removable display 105 may be a curved display that helps reduce field curvature. The removable display 105 may be composed of one or more materials (e.g., plastic, glass, etc.) with one or more refractive indices that effectively minimize the weight and widen a field of view of a user viewing the removable display 105. The removable display 105 may emit linearly polarized light. In some embodiments, the removable display 105 includes one or more linear polarizers that linearly polarize light emitted from the removable display 105.

The removable display 105 may interface with any of the devices in the distributed artificial reality system 100. For example, the removable display 105 may be incorporated into the eyewear device 115, the bracelet 110, the neckband 120 and/or any other device in communication with the distributed artificial reality system 100, such as a mobile device. The removable display 105 may be incorporated into any other device in the distributed artificial reality system 100 by being physically coupled to the other device. This is described in further reference to FIGS. 2-5. To function separately from the devices in the distributed artificial reality system 100, the removable display 105 has a screen or image light-emitting surface and one or more contact surfaces that may be handled by a user without damage to the image light-emitting surface. For example, edge surfaces around a light-emitting surface may be coated in a protective layer, such as a plastic or polymer. As shown in FIG. 1, there is one removable display 105, however there may be two or more removable displays 105. For example, there may be two removable displays 105, such that each removable display 105 interfaces with each of the two optical systems 140 in the eyewear device 115.

The removable display 105 may have a power source and a wireless gateway. The power source may be re-chargeable. The power source may be a battery, such as a lithium ion battery, lithium-polymer battery, primary lithium battery, alkaline batteries, or any other form of power storage. The removable display 105 may be communicatively coupled to the bracelet 110, the eyewear device 115, neckband 120, or any other device in the distributed artificial reality system 100, such as a mobile device, as described in FIG. 5. The removable display 105 may be communicatively coupled with a wireless gateway or directional antenna (not shown), located anywhere on the removable display 105, through which it transmits and receives information from the eyewear device 115, neckband 120, and/or any other device in the distributed artificial reality system 100. For example, the removable display 105 may receive information about the display image through a wireless signal received from any of the eyewear device 115, neckband 120 or mobile device.

In some examples, the removable display 105 is communicatively coupled to any of the other devices in the distributed artificial reality through a wired connection, such as a wire connecting the removable display 105 to another device. The wire may be retractable or otherwise adjustable, such that the removable display 105 may be located at any desired distance from the second device. In these examples, the removable display 105 may receive both communication and power from a second device through the wired connection. The communication may, for example, provide information about the content displayed on the removable display 105. The removable display 105 may be fully powered by a second device through the wired connection, or may have its own power source that is recharged by the second device through the wired connection.

In some examples, the physical coupling between the removable display 105 and a second device, which secures the removable display 105 to the second device, includes a communication and/or power coupling. For example, the removable display 105 may be physically coupled and secured to the eyewear device 115 through a coupling interface that provides information about the content displayed on the removable display 105 and/or power. In these examples, the removable display 105 may have its own power source that is recharged by the second device through a coupling interface. In other examples, the removable display 105 may be fully charged through the physical coupling and the second device.

The physical coupling between the removable display 105 and any of the other devices in the distributed artificial reality system 100 may be through clips, snap assemblies, magnetic couplers, interlocking pieces, or any other means of securing the removable display 105 to the other device. Power and information may be conveyed through the physical coupling. For example, if the removable display 105 is coupled to the eyewear device 115 with magnetic couplers, then information and power may pass between the eyewear device 115 and the removable display 105 through the magnetic couplers.

Examples of media presented by the removable display 105 include one or more images, text, video, or some combination thereof. The removable display 105 can be configured to operate, with the eyewear device 115 as a VR, an AR, a mixed reality (MR) environment, or some combination thereof. For example, in some embodiments, the removable display 105 may augment views of a physical, real-world environment with computer-generated elements (e.g., images, video, sound, etc.). The media presented by the removable display 105 may be adjusted in response to a user's hand gesture as detected by the bracelet 110. For example, the bracelet 110 may determine that a user is pointing to a virtual object in the visual artificial reality displayed on the removable display 105. In response, the view shown by the removable display 105 may zoom in on the object, display information about the object, bring the object into focus, or any other adjustment that responds to the user's gesture. The removable display 105 can be coupled to any of the devices in the distributed artificial reality system 100, examples of which are shown in further detail with respect to FIG. 2-4.

Bracelet

The bracelet 110 detects movement of a user's hand and provides an optional interface for coupling with the removable display 105. The interface secures the removable display 105 to the bracelet 110, and is described in further detail with reference to FIG. 3. The bracelet 110 includes a position sensor 125, a camera 130 and magnetic sensors 135 which are all discussed in further detail below. The bracelet 110 is shown as a circlet formed from a band with rounded edges. The bracelet 110 fits around the wrist of a user. The bracelet 110 may be formed from any flexible material, such as an elastomer or other polymer material. The sizing of the bracelet 110 may be adjustable, such that the band size can be fit to the wrist of each individual user. The bracelet 110 includes an attachment surface (not shown), to which the removable display 105 may be coupled.

As shown, the bracelet 110 includes a position sensor 125. There may be any number of position sensors 125 located at various points on the bracelet 110. The one or more position sensors may be located external to an inertial measurement unit (IMU) (not shown), internal to an IMU, or some combination thereof. The position sensor 125 may be any sensor capable of determining a position of the bracelet 110 and generating a signal in response to movement of the bracelet 110. Since the bracelet 110 is worn on a user's wrist, the position sensors 125 therefore provide position signals that result from the movement of a user's arm. In some embodiments, the position sensor 125 tracks the position of the bracelet 110 over time, using a previous location data point to determine subsequent positions. In some embodiments, the position sensor 125 may be an accelerometer that measures translational motion (e.g., forward/back, up/down, left/right). Additionally or alternatively, the position sensor 125 is a gyroscope that measures rotational motion (e.g., pitch, yaw, and roll). In some embodiments, the multiple accelerometers and multiple gyroscopes located on the bracelet 110 together provide position signals indicating movement of the bracelet 110 in six degrees of freedom. The position sensor 125 may be a MEMS device.

The one or more position sensors 125 provide position signals to an IMU (not shown) which may be located on the bracelet 110, eyewear device 115, and/or neckband 120. The IMU uses the position signals from the one or more position sensors 120 to estimate a position of the bracelet 110. The IMU may estimate a relative position of the bracelet 110 with respect to the eyewear device 115, neckband 120, and/or any other device in a distributed artificial reality system 100, such as a mobile device as described FIG. 5. In some embodiments, the IMU rapidly samples the measurement signals from the one or more position sensors 120 and calculates the estimated position of the bracelet 110 from the sampled data. For example, the IMU integrates the measurement signals received from the one or more position sensors 120 over time to estimate a velocity vector, and integrates the velocity vector over time to determine an estimated position of a reference point of the bracelet 110. Some or all of the computation for the IMU processing of the position signals from the one or more position sensors 125 may be carried out by the computation compartment 170 of the neckband 120, the eyewear device 115, a mobile device (not shown), or any other device in the distributed artificial reality system 100.

An IMU, computation compartment 170, or any other processor that determines position from the position sensor 125 may receive one or more calibration parameters from the bracelet 110. The one or more calibration parameters are used to maintain tracking of the bracelet 110. Based on a received calibration parameter, an IMU may adjust one or more IMU parameters (e.g., sample rate). The adjustment may be determined by the computation compartment 170 of the neckband 120, a processor of a mobile device, or any other processor of a device in the distributed artificial reality system 100. In some embodiments, certain calibration parameters cause the IMU to update an initial position of the reference point so it corresponds to a next calibrated position of the reference point. Updating the initial position of the reference point at the next calibrated position of the reference point helps reduce accumulated error associated with the determined estimated position of the bracelet 110. The accumulated error, also referred to as drift error, causes the estimated position of the reference point to "drift" away from the actual position of the reference point over time. In some examples, the IMU receives position information from both the one or more position sensors 125 on the bracelet 110 as well as position sensors (not shown) on the eyewear device 115 and position sensors (not shown) on the neckband 120.

As shown in FIG. 1, the bracelet 110 includes a camera 130. There may be one or more cameras 130 located on the bracelet 110. The one or more cameras 130 capture gesture information of a user's hand, as visible from the bracelet 110. Gesture information about the user's hand includes finger motions and pose, as well as palm motions pose. A gesture, pose, position or movement of a user's hand may be pointing, waving, or any other signal made by a user's hand. While the visual information may be captured by the one or more cameras 130, a hand gesture, pose or position of the user's hand may be determined from the visual information by a processor not physically located in the bracelet 110. The processor may be located on the neckband 120, eyewear device 115, or any other device in the distributed artificial reality system 100, such as a mobile device as described with reference to FIG. 5. The visual information captured by the one or more cameras 130 may be used in a kinematic model of the hand, which relates visual detected movements of the user's hand to a hand gesture. The kinematic model may be machine learned, such that over time a model relating the movement information captured by the one or more cameras 130 is adapted to a user's hand gestures. The kinematic model may combine visual information collected from the one or more cameras 130 with other information from other sensors on the bracelet 110, eyewear device 115 and/or neckband 120. For example, the visual information from the camera 130 may be combined with movement information determined by the position sensor 125 and/or IMU. In other examples, the visual information from the camera 130 may be combined with visual information obtained from a camera located on the eyewear device 115 and/or neckband 120 (not shown). The kinematic model may be stored in a controller, or other software module (not shown). For example, the kinematic model may be stored in a mobile device, such as the mobile device described with reference to FIG. 5. The processor communicates with the controller or software model and uses the kinematic model to determine a pose, gesture or hand signal from any of the signals from the camera 130, position sensor 125, magnetic sensors 135, or any other sensors located on the bracelet 110. The processor is located on the neckband 120, eyewear device 115, or any other device in the distributed artificial reality system 100, such as a mobile device as described with reference to FIG. 5.

In some examples, the camera may be a depth camera assembly that collects depth image data of a user's hand. A hand tracking unit, located on any of the eyewear device 115, neckband 120, and/or a mobile device may include a neural network that uses the depth image data to determine a hand pose of the user's hand. Additional details regarding determining a pose, gesture, or other information about a user's hand may be found at, e.g., U.S. patent application Ser. No. 15/487,361, which is hereby incorporated by reference in its entirety.

The signals describing the movement of a user's hand as determined by the camera 130, one or more position sensors 120 and IMU are combined with the signals produced by the magnetic sensors 135 which measure a relative position of the bracelet 110 with respect to a background magnetic field. The magnetic sensors 135 may be located anywhere on the bracelet 110, and there may be any number of magnetic sensors 135 distributed on the bracelet 110. The magnetic sensors 135 may be magnetometers, MEMS magnetic field sensors, or any other magnetic sensor capable of detecting the direction, strength, and/or change in a magnetic field.

A baseline, background magnetic field exists in any environment in which the bracelet 110 operates, whether this be the result of the Earth's magnetic field or from the presence of other electronic devices in the environment that generate electromagnetic radiation. Regardless of the source, an ambient, background magnetic field exists in the environment, though it may have different directions and/or magnitudes. The magnetic sensors 135 measure a vector direction of the background magnetic field. When the bracelet 110 moves in response to movement of a user's arm, the vector direction measured by the magnetic sensors 135 changes in response to the new orientation of the bracelet 110 with respect to the background magnetic field. In some embodiments, it is assumed that the background magnetic field does not change in time, and thus that the detected changes in the magnetic field result from the movement of the bracelet 110. In some embodiments, the magnetic sensors 135 are 3D magnetometers and thus each detect changes in three degrees of freedom. In other embodiments, each magnetic sensor may be configured to generate a signal in response to changes in a single direction, so that to achieve three degrees of freedom, three different magnetic sensors 135 are configured to detect along three separate axes.

Together, the magnetic sensors 135 produce signals giving the gradient of the change in the measured magnetic field resulting from the bracelet 110 movement with respect to a stationary, background magnetic field. From this gradient, a velocity of the bracelet 110 may be determined, which may contain both rotational and linear velocity components. However, rotational velocity may be independently measured by the position sensors 120, such as by gyroscope position sensors 120. Thus combining the measurement from the magnetic sensors 135 with the known rotational measurement from the position sensors 120 allows for the linear velocity component of the gradient to be independently determined from the measured gradient. This linear velocity may thus be determined without being subject to error from drift in the integrated linear accelerometer and IMU measurement that may affect the accuracy of the position sensors 120. Similarly, the rotational component of velocity of the bracelet 110 may be determined from the gradient measured by the magnetic sensors 135 if the known linear velocity measured by accelerometer position sensors 120 is used to determine an unknown rotational velocity.

In some embodiments, measurements from any of the position sensor 125, camera 130 and magnetic sensors 135 may be combined into a kinematic model to determine a hand gesture, the position of the user's arm, and/or the position of the user's forearm. In some embodiments, measurements from any of the position sensor 125, camera 130, and magnetic sensors 135 may be used in a Simultaneous Localization and Mapping (SLAM) calculation, which may be carried out by the computation compartment 170 located on the neckband 120 and/or any other device in the distributed artificial reality system 100, such as a mobile device as described in FIG. 5.

In some embodiments, the bracelet 110 includes a wireless gateway or directional antenna (not shown), located anywhere on the bracelet 110, through which it transmits and receives information from the removable display 105, eyewear device 115, neckband 120, and/or any other device in the distributed artificial reality system 100. The wireless connection between the bracelet 110, removable display 105, eyewear device 115 and/or neckband 120 may be a WiFi connection, a BLUETOOTH connection, or any other wireless connection capable of transmitting and receiving information. The wireless gateway may also connect the bracelet 110 to a mobile device, as described in further detail with reference to FIG. 5. In other embodiments, the bracelet 110 is connected to the removable display 105, neckband 120, eyewear device 115, or any other device in a distributed artificial reality system, such as a mobile device, through a wired connection. In these examples, a wired connection may provide power to the bracelet 110 and/or transmit information from the bracelet 110 to a second device. For example, the battery compartments 155 in the neckband 120 may provide power to the bracelet 110 through a wired connection. The connecting wire may be retractable or otherwise adjustable in length.

In some embodiments, the bracelet 110 includes a battery compartment (not shown) through which any of the position sensor 125, camera 130 and magnetic sensors 135 are powered. The power source in the battery compartment may be re-chargeable. The power source in the battery compartment may be lithium ion batteries, lithium-polymer battery, primary lithium batteries, alkaline batteries, or any other form of power storage.

The bracelet 110 may couple with the removable display 105, such that the visual information output by the removable display 105 is visible to a user while wearing the bracelet 110. In addition, the bracelet 110 measures movements of a user's hands, which are used to determine hand gestures. The hand tracking as determined by the signals collected from sensors on the bracelet 110 are used as inputs to determine the visual media displayed on the removable display 105. The coupling between the bracelet 110 and the removable display 105 is discussed in further detail with reference to FIG. 3.

Eyewear Device

The eyewear device 115 provides visual content to a user of the distributed system 100 when coupled to the removable display 105 through a coupling interface, which secures the removable display to the eyewear device 115. Coupling between the eyewear device 115 and the removable display 105 is described in further detail with respect to FIG. 2. When uncoupled from the removable display 105, the eyewear device 115 allows a user to view his or her environment through the optical systems 140, and the eyewear device 115 may be worn by a user without a visual component of the artificial reality environment. The eyewear device 115 includes two optical systems 140. In some embodiments, the optical systems 140 include pancake lens assemblies, which allow the user to view their environment through the eyewear device 115 when the removable display 105 is uncoupled from the eyewear device 115. In other examples, the optical systems 140 may include other types of optical systems, such as a series of geometric phase lenses, liquid crystal lenses, or any other lens assembly with adjustable optical power. In other examples, the optical systems 140 may include any number of Fresnel lenses, or positive lenses. In some examples, elements of the optical systems 140 may be removable, such that when a removable display 105 is un-coupled from the eyewear device 115, the removable elements of the optical systems 140 are returned to the optical systems 140. For example, when a removable display 105 is un-coupled from the eyewear device 115, a removable corrective plate may be placed in the optical system 140. When the removable display 105 is coupled to the eyewear device 115, the corrective plate may be removed from the optical system 140. The lens assembly in the optical systems 140 may be transparent or semi-transparent. The eyewear device 115 may also include a variety of sensors, such as one or more passive sensors, one or more active sensors, one or more audio devices, an eye tracker system, an IMU (not shown), or some combination thereof. The optical systems 140 and sensors are described in further detail below. As shown in FIG. 1, the eyewear device 115 and optical systems 140 are formed in the shape of eyeglasses, with the two optical systems 140 acting as eyeglass "lenses" within a frame 145. The frame 145 is attached to a neckband 120 by a connector 150.

In one embodiment, optical systems 140 include pancake lens assemblies that, when paired with the removable display 105, are used to present visual media to a user wearing the eyewear device 115. As described above, the optical systems 140 may have other types of lens assemblies. The pancake lens or other lens assemblies are fixed, and built into the eyewear device 115, while the removable display 105, which provides the image light, can be uncoupled from the eyewear device 115. In one example, the pancake lens assemblies correct optical aberrations from the removable display 105, mitigate field curvature and reduce pupil swim when coupled in the eyewear device 115 with the removable display 105. When the removable display 105 is uncoupled from the eyewear device 115, the optical systems 140 are semi-transparent, and allow a user to view his or her environment through the optical systems 140. For example, when the removable display 105 is uncoupled from the eyewear device 115, the eyewear device 115 may be used as a pair of sunglasses, such that the pancake lens assemblies of the optical systems 105 polarize and attenuate light from a user's environment. In some examples, the pancake lens assemblies may be monolithic lens assemblies. The optical systems 140 may include corrective lenses, which may be customizable for a user's eyeglasses prescription. The optical systems 140 may be bifocal corrective lenses. The optical systems 140 may be trifocal corrective lenses. The coupling of the optical systems 140 with the removable display 105 is described in further detail with reference to FIG. 2.

The eyewear device 115 may include embedded sensors (not shown) such as 1-dimensional (1D), 2-dimensional (2D) imagers, or scanners for localization and stabilization of the eyewear device 115, as well as sensors for understanding the user's intent and attention through time. The sensors located on the eyewear device 115 may be used for SLAM calculations, which may be carried out in whole or in part by the processor embedded in the computation compartment 170 and/or a processor located in a coupled mobile device, as described in further detail with reference to FIG. 5. Embedded sensors located on the eyewear device 115 may have associated processing and computation capabilities.

In some embodiments, the eyewear device 115 includes a camera (not shown) which is able to detect the removable display 105 when it is decoupled from the eyewear device 115. The camera may be located on the frame 145, and oriented such that the user's field-of-view overlaps with that of the camera (e.g., so that the camera may detect what a user is looking at in his or her environment). The camera may be a depth-camera-assembly (DCA), a Time-of-Flight (TOF) camera, a Structured Light (SL) camera, a red green and blue (RGB) color camera, or any other camera assembly capable of visually detecting the presence of the removable display 105. The camera may transmit any captured visual data to a processor (not shown). This processor may be located in the eyewear device 115, within the computation compartment 170 of the neckband 120, in a mobile device of the distributed artificial reality system, or any other device in signal communication with the eyewear device 115. The processor uses the visual information provided by the camera on the eyewear device 115 to detect the presence of the removable display 105 within the field of view of the user. When the removable display 105 is coupled to the eyewear device 115, this function may be disabled, and the camera either turned off or used for a different function.

In some embodiments, the eyewear device 115 further includes an eye tracking system (not shown) for tracking a position of one or both eyes of a user. Note that information about the position of the eye also includes information about an orientation of the eye, i.e., information about user's eye-gaze. Based on the determined and tracked position and orientation of the eye, and combined with the visual information about the position of the removable display 105 collected by a camera, the removable display 105 may be directed by a processor to adjust emitted image light. This embodiment is described below.

If the removable display 105 is uncoupled from the eyewear device 115, the eye tracking system may be combined with a camera on the eyewear device 115 to determine if a user is viewing the removable display 105, and adjust emitted image light from the removable display 105 in response. The eye tracking system may determine an orientation of a user's eye and/or a focal distance of the user's eye. In this embodiment, the eye tracking system conveys the orientation and/or a focal distance of the user's eye to a processor. In conjunction, a camera located on the eyewear device 115 or any other device in the distributed artificial reality system 100 determines a location of the removable display 105 and conveys this information to a processor. As described above, the processor may be located on any device in the distributed artificial reality system 100. The processor then combines the eye tracking information with the camera visual information to determine if the user is oriented in a direction in which the removable device 105 is located, and/or if the user is focused in a focal plane in with the removable device 105 is located. If the processor determines that the removable device 105 is located in a direction or focal plane of the user's gaze, the processor may convey instructions to the removable device to emit image light. If the processor determines that the removable display 105 is in a different focal plane of the user, or that the user's eyes are not oriented towards the removable display 105, the processor may instruct the removable display 105 to stop emitting image light. In some examples, there may be a threshold time in which the processor determines that a user is not viewing or focused on the removable display 105, after which the removable display 105 is instructed to stop emitting image light. This may conserve the power of the removable display 105, since it may only emit image light when the eye tracking system and the camera determine that a user is looking at the removable display 105 and otherwise be switched OFF.

When the removable display 105 is coupled to the eyewear device 115, the eyewear device 115 may adjust focus of the image light output by the removable display 105 to ensure that the image light is in focus. The eye tracking system determines a focal plane of the user's eyes, and conveys this information to a processor located on any device in the distributed artificial reality system 100. The processor then instructs the removable display 105 to emit image light in focus for the user. The processor may calculate any associated image rendering to display an image in focus to the user on the removable display 105. When the removable display 105 is uncoupled from the eyewear device 115, the eye-tracking system may convey information about the focal distance of the user to the optical systems 140. In response, the optical systems 140 may adjust the optical power of the optical systems 140 so that the user's environment is in focus. In other examples, when the removable display 105 is uncoupled from the eyewear device 115, a corrective plate is added to the optical system 140 so that the user's environment is in focus. In other examples, an element of the optical system 140 may be removed when the removable display 105 is uncoupled from the eyewear device 115. In some examples, the eye tracking system also determines the angle of eye-gaze in order to mitigate the vergence-accommodation conflict (VAC). The image light emitted by the removable display 105 may be adjusted to correspond to the angle of eye-gaze of the user. Additionally or alternatively, the eyewear device 115 adjusts resolution of the image light output by the coupled removable display 105 by performing foveated rendering of the image light, based on the position of the eye. Additionally or alternatively, the eyewear device 115 uses the information on a gaze position and orientation to provide contextual awareness for the user's attention, whether on real or virtual content. The eye tracker generally includes an illumination source and an imaging device (camera). In some embodiments, components of the eye tracker may be located on the removable display 105, and used when the removable display 105 is coupled to the eyewear device 115. In some embodiments, components of the eye tracker may be located in the optical system 140. Additionally or alternatively, components of the eye tracker are integrated into the frame 145. Additional details regarding incorporation of eye tracking system and eyewear devices may be found at, e.g., U.S. patent application Ser. No. 15/644,203, which is hereby incorporated by reference in its entirety.

Computation for the eye-tracking system may be carried out by the processor located in the computation compartment 170 and/or a coupled mobile device, as described in further detail with reference to FIG. 5. The eyewear device 115 may include an IMU sensor (not shown) to determine the position of the eyewear device relative to a user's environment, as well as detect user movement. The IMU sensor may also determine the relative spatial relationship between the eyewear device 115 and the neckband 120, the spatial relationship between the eyewear device 115 and the bracelet 110, and/or the spatial relationship between the eyewear device 115 and the removable display 105, which may provide information about the position of the user's head relative to the position of the user's body and hand. Here the neckband 120 may also include an IMU sensor (not shown) to facilitate alignment and orientation of the neckband 120 relative to the eyewear device 115. The IMU sensor on the neckband 120 may determine the orientation of the neckband 120 when it operates independently of the eyewear device 115.

The eyewear device 115 may also include a depth camera assembly (DCA) (not shown), which may be a Time-of-Flight (TOF) camera, a Structured Light (SL) camera, a passive and/or active stereo system, and may include an infrared (IR) light source and detection camera. A DCA captures visual information of various depth zones of a scene of an area surrounding a device, such as the eyewear device 115. The DCA may capture visual information about the position of the removable display 105 relative to the eyewear device 115, such as whether the removable display 105 is within view of a user wearing the eyewear device 115. Additional details describing the DCA may be found at, e.g., U.S. patent application Ser. No. 15/372,779, which is hereby incorporated by reference in its entirety. The eyewear device 115 may include a variety of passive sensors, such as a red green and blue (RGB) color camera, passive locator sensors, etc. Cameras on the eyewear device 115 may supplement visual information about the user's hand, as determined by the one or more cameras 125 located on the bracelet 110. Cameras on the eyewear device 115 may also collect visual information about the location of the removable display 105. The eyewear device 115 may include a variety of active sensors, such as structured light sensors, active locators, etc. The number of active sensors may be minimized to reduce overall weight, power consumption and heat generation on the eyewear device 115. Active and passive sensors, as well as camera systems may be placed anywhere on the eyewear device 115.

Neckband

The neckband 120 is a wearable device that performs processing intensive operations offloaded to it from other devices (e.g., the removable display 105, the bracelet 110, the eyewear device 115, a mobile device, etc.). As shown in FIG. 1, the neckband 120 is connected to the eyewear device 115 by the connection junction 150. The neckband 120 is wirelessly connected to the bracelet 110 through any standard wireless signal connection. In some embodiments, the neckband 120 is wirelessly connected to the removable display 105. The neckband 120 includes battery compartments 155 located on each of the first arm 160, second arm 165 and computation compartment 170. As shown, battery compartment 155 is embedded in both the first arm 160 and the second arm 165. As shown, a computation compartment 170 is connected to both the first arm 160 and the second arm 165.

Any of the above components may be located in any other part of the neckband 120. There may be any number of battery compartments 155 distributed across the neckband 120. There may be any number of computation compartments 170 distributed across the neckband 120. The battery compartment 155 and computation compartment 170 are preferably located such that weight is distributed evenly across the neckband 120, from left-to-right across the device symmetrical axis. Battery compartments may be located symmetrically across the device symmetrical axis, or may be asymmetrically distributed to balance out the weight of other sensors or compartments. For example, the battery compartments 155 may be located on the first arm 160 to balance out a computation compartment located on the second arm 165.

The neckband 120, composed of the first arm 160, the second arm 165 and the computation compartment 170, is formed in a "U" shape that conforms to the user's neck. The neckband 120 is worn around a user's neck, while the eyewear device 115 is worn on the user's head (not shown).

The first arm 160 and second arm 165 of the neckband 120 may each rest on the top of a user's shoulders close to his or her neck such that the weight of the first arm 160 and second arm 165 are carried by the user's neck base and shoulders. The computation compartment 170 may sit on the back of a user's neck. The connector 150 is long enough to allow the eyewear device 115 to be worn on a user's head while the neckband 120 rests around the user's neck. The connector 150 may be adjustable, allowing each user to customize the length of connector 150.

The power source in the battery compartment 155 may be in one or more sub-assemblies (with two as shown) where the unit embedded in the first arm 160 and/or the battery compartment 155 in the second arm 165 powers the eyewear device 115. Each battery compartment 155 houses a power source (e.g., batteries) which may be re-chargeable. The power source in the battery compartment 155 may be lithium ion batteries, lithium-polymer batteries, primary lithium batteries, alkaline batteries, or any other form of power storage. If more than one battery sub-assembly is utilized, the battery compartment 155 of the first arm 160 may have a different battery or power capacity than the battery in the battery compartment 155 of the second arm 165. The computation compartment 170 may have its own power source (not shown) and/or may be powered by a power source in the battery compartments 155. Locating the battery compartments 155 on the neckband 120 distributes the weight and heat generated by the battery compartment 155 from the eyewear device 115 to the neckband, which may better diffuse and disperse heat, and also utilizes the carrying capacity of a user's neck base and shoulders. Locating the battery compartments 155, computation compartment 170 and any number of other sensors on the neckband 120 may also better regulate the heat exposure of each of these elements, as positioning them next to a user's neck may protect them from solar and environmental heat sources The computation compartment 170 houses a processor (not shown), which processes information generated by any of the sensors or camera systems on the bracelet 110, eyewear device 115 and/or the neckband 120. The processor of the computation compartment 170 is communicatively coupled to the eyewear device 115. The processor of the computation compartment 170 is communicatively coupled to the bracelet 110. The processor of the computation compartment 170 is communicatively coupled to the removable display 105, and may provide instructions to the removable display based off of any of the information generated by the bracelet 110, eyewear device 115 and/or neckband 120. Information generated by the bracelet 110, eyewear device 115 and the neckband 120 may also be processed by a mobile device, such as the mobile device described in further detail with reference to FIG. 5. A processor of a mobile device, such as the mobile device described in further detail with reference to FIG. 5, may be communicatively coupled to the removable device 105, the eyewear device 115 and/or the bracelet 110. The processor in the computation compartment 170 may process information generated by each of the removable display 105, the bracelet 110, the eyewear device 115 and the neckband 120. When the removable display 105 is coupled to the eyewear device 115, the connector may convey information between the removable display 105 and the neckband 120, and between the processor in the computation compartment 170 and the removable display 105. The connector 150 conveys information between the eyewear device 115 and the neckband 120, and between the eyewear device 115 and the processor in the computation compartment 170. The bracelet 110 may convey information to the computation compartment 170 via a wireless gateway located on the bracelet 110 and neckband 120. The wireless gateway of the neckband 120 is described in further detail with reference to FIG. 5. In some examples, the first arm 160, and second arm 165 may also each have an embedded processor (not shown). In these examples, the connector 150 conveys information between the eyewear device 115 and the processor in each of the first arm 160, the second arm 165 and the computation compartment 170. In these examples, information received from the bracelet 110 through a wireless gateway may be distributed to each of the first arm 160, second arm 165 and the computation compartment 170 for processing. The information may be in the form of optical data, electrical data, or any other transmittable data form. Moving the processing of information generated by the bracelet 110 and eyewear device 115 to the neckband 120 reduces the weight and heat generation of the bracelet 110 and eyewear device 115, making them more comfortable to the user and encouraging user over longer time scales.

The processor embedded in the computation compartment 170 may compute all inertial and spatial calculations from IMU sensors located on the bracelet 110 and eyewear device 115. The processor embedded in the computation compartment 170 may compute all calculations from the active sensors, passive sensors, and camera systems located on the eyewear device 115, as well as the position sensor 125, camera 130 and magnetic sensors 135 on the bracelet 110. The processor embedded in the computation compartment 170 may perform all computations from information provided by any sensor located on the bracelet 110 and/or eyewear device 115. The processor embedded in the computation compartment 170 may perform all computation from information provided by any sensor located on the bracelet 110 and/or eyewear device 115 in conjunction with a processor located on a coupled external device, such as a mobile device as described in further detail with reference to FIG. 5.

The neckband 120 may include a multifunction compartment (not shown). The multifunction compartment may be a customizable compartment in which additional feature units may be inserted and removed by a user. Additional features may be selected and customized by the user upon purchase of the neckband 120. Examples of units that may be included in a multifunction compartment are: an imaging device, a memory unit, a processing unit, a microphone array, a projector, a camera, etc. These may be described in further detail with reference to FIG. 5.

The computation compartment 170 and battery compartment 155 may be segments of the neckband 120 as shown in FIG. 1. However, computation compartments 170 and battery compartments 155 may also be any sub-structures of neckband 120, such as compartments embedded within neckband 120, compartments coupled to sensors embedded in neckband 120, and/or may be located anywhere on neckband 120.

In some examples, the connector 150 conveys information from the eyewear device 115 to the neckband 120. Sensors located on the eyewear device 115 may provide the processor embedded in the computation compartment 170 with sensing data, which may be processed by the processor in the computation compartment 170. The computation compartment 170 may convey the results of its computation to the eyewear device 115. For example, if the removable display 105 is coupled to the eyewear device 115, and the result of the processor in the computation compartment 170 is a rendered result to be displayed to a user, the computation compartment sends the information through the connector 150 to be displayed on the removable display 105. In some examples, there may be multiple connectors 150. For example, one connector 150 may convey power, while another connector 150 may convey information.

In some examples, the connector 150 provides power to the eyewear device 115 through magnetic induction at the connector junctions (not shown) with the frame 145. In this example, the connector 150 may be coupled to the frame 145 with retention magnets. In other examples, the connector 150 provides power from the neckband 120 to the eyewear device 115 through any conventional power coupling technique. The connector 150 is flexible to allow for independent movement of the eyewear device 115 relative to the neckband 120. The connector 150 may be retractable, or otherwise adjustable to provide the correct length between the near-eye-display and the neckband 120 for each user, since the distance between a user's head and neck may vary.

In some examples, the eyewear device 115 is wirelessly coupled with the neckband 120. In these examples, the processor embedded in the computation compartment 170 receives information from the eyewear device 115 and the sensors and camera assemblies located on the eyewear device 115 through the wireless signal connection, and may transmit information back to the eyewear device 115 through the wireless signal connection. The wireless connection between the eyewear device 115 and the neckband 120 may be through a wireless gateway (not shown) or directional antenna, located in the first arm 160 and/or second arm 165 and/or on the eyewear device 115. The wireless connection between the eyewear device 115 and the neckband 120 may be a WiFi connection, a BLUETOOTH connection, or any other wireless connection capable of transmitting and receiving information. The wireless gateway may also connect the eyewear device 115 and/or the neckband 120 to a mobile device, as described in further detail with reference to FIG. 5.

In some examples in which the eyewear device 115 is wirelessly coupled with the neckband 120, the connector 150 may only transmit power between the neckband 120 and the eyewear device 115. In some examples, when the removable display 105 is coupled to the eyewear device 115, and the eyewear device 115 is connected to the neckband 120 through the connector 150, the neckband 120 may power both the eyewear device 115 and the coupled removable display 105 through the connector 150. Information between the eyewear device 115 and neckband 120 would thus be transmitted wirelessly. In these examples, the connector 150 may be thinner. In some examples in which the eyewear device 115 is wirelessly coupled with the neckband 120, power may be transmitted between the eyewear device 115 and the neckband 120 via wireless power induction. Additionally or alternatively, power may be transmitted between the neckband 120 and the bracelet 110 via wireless power induction. In some examples, there may be a separate battery or power source located in the eyewear device 115. In some examples in which the eyewear device 115 is wirelessly coupled with the neckband 120, the addition of a connector 150 may be optional.

Interaction Between Devices in Distributed System

The visual component of the artificial reality displayed on the removable display 105 may change in response to movement of the user's hand as measured by the bracelet 110. Additionally or alternatively, audio components of an artificial reality, produced by the removable display 105, the eyewear device 115 or the neckband 120 may be adjusted in response to movements of the user's hand as measured by the bracelet 110. Any other component of the artificial reality generated by the removable display 105, the eyewear device 115 and/or the neckband 120 may be altered in response to a user's gestures or hand movement as measured by the bracelet 110. For example, the bracelet 110 may determine that a user is pointing to a virtual object that is displayed in the removable display 105 coupled to the eyewear device 115, and in response, the image of the removable display 105 may zoom in on the object.

The removable display 105, the bracelet 110, the eyewear device 115 and the neckband 120 architecture thus allows the user's artificial reality experience to be through small form factor devices, while still maintaining the processing and battery power necessary to provide a full artificial reality experience. Furthermore, the bracelet 110 allows the distributed artificial reality system 100 to determine a user's hand motions in response to the artificial reality displayed and generated through the removable display 105 when coupled to the eyewear device 115. The form factor of the bracelet 110 can be reduced since its processing may be carried out by the neckband 120. The movement detected by the bracelet 110 can be further contextualized by combining user hand gestures with information about the user's real world environment, as determined by sensors located on the eyewear device 115 and/or neckband 120. The removable display 105 allows a visual component of an artificial reality environment to be moved to any of the devices in the distributed artificial reality environment 100, and may allow the eyewear device 115 to function as a non-artificial reality device, since the image display portion may be removed from the eyewear device 115.

Figure 2:
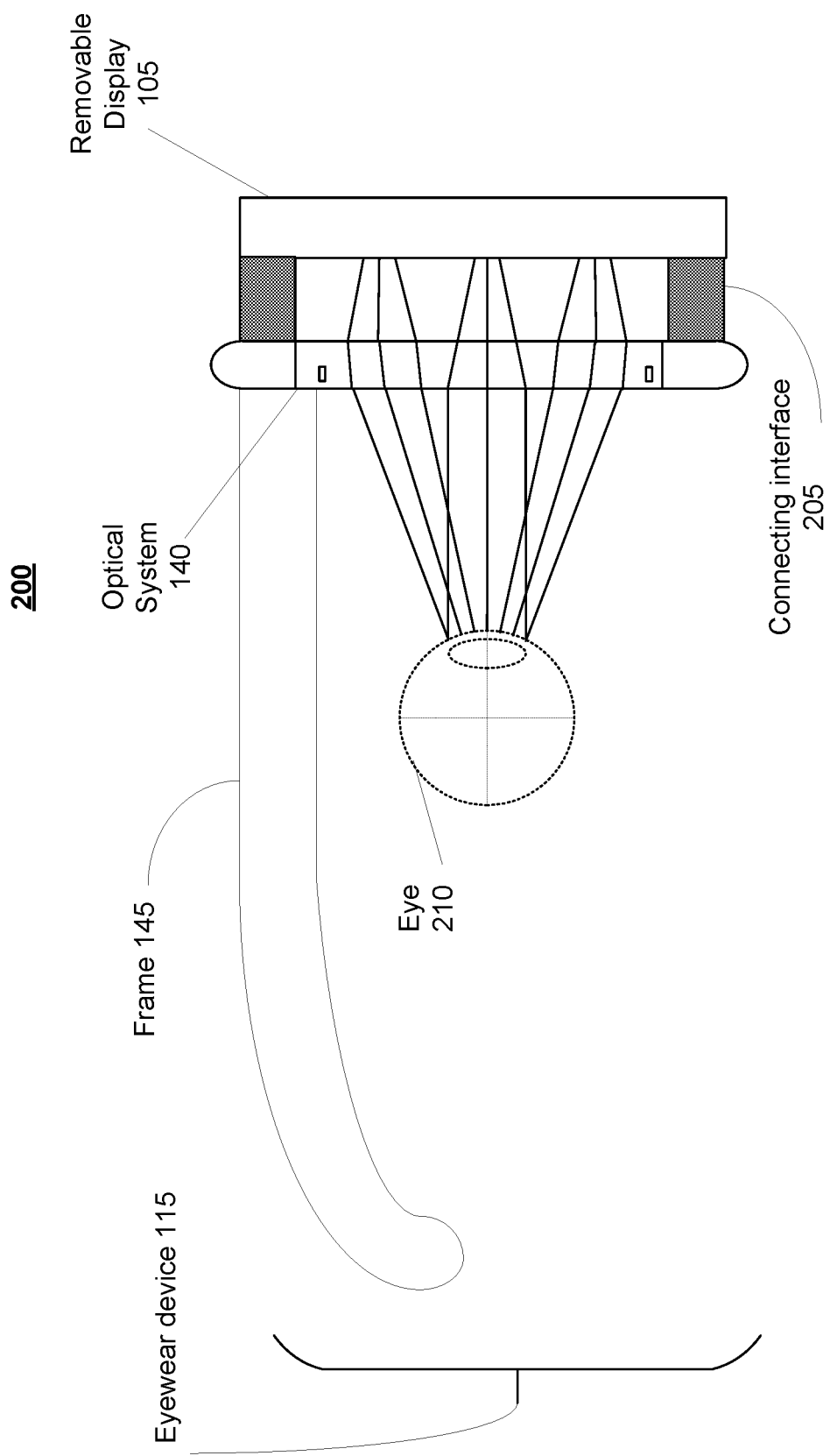
FIG. 2 is a partial cross section of an eyewear device that is coupled to a removable display, in accordance with one or more embodiments.

FIG. 2 is a partial cross section 200 of an eyewear device 115 that is coupled to a removable display 105, in accordance with one or more embodiments. The eyewear device 115 is described in further detail with respect to FIG. 1. In some embodiments, the removable display 105 provides image light that is projected from the removable display 105 through the optical system 140 to a user's eye 210. The removable display 105 is coupled to the frame 145 through a connecting interface 205, which is described in further detail below. In some embodiments, the optical system 140 includes a pancake lens assembly, which is described in further detail below. The optical system 140 may be semi-transparent, such that if the removable display 105 is uncoupled from the eyewear device 115, the user's eye 210 may be able to view his or her environment through the optical system 140. While the cross section 200 shows the removable display 105 and the optical system 140, there may be any additional number of waveguides, gratings, light expansions, etc. between the removable display 105 and the eye 210.

The removable display 105 presents visual media to a user by generating image light with a projector and conveying the output light to a user's eye 210. The removable display 105 may include any number of waveguides, gratings, light expansions, etc. The removable display 105 thus provides a visual component of an artificial reality environment through generated image light, and in some embodiments, may be overlaid on top of a user's real-world environment. In embodiments in which the user's eye 210 is able to view his or her environment in addition to the artificial reality environment projected from the removable display 105, the optical system 140 may include a correcting plate located opposite the removable display 105 which provides negative optical power, and thus offsets positive optical power in the optical system 140. Elements in the optical system 140 and/or removable display 105 may act to correct aberrations in image light emitted from the removable display 105, correct aberrations for any light source due to the user's visual prescription needs, magnify image light, perform some other optical adjustment of image light emitted from the removable display 105, or some combination thereof. An element may include an aperture, a Fresnel lens, a convex lens, a concave lens, a liquid crystal lens, a liquid or other deformable surface lens, a diffractive element, a waveguide, a filter, a polarizer, a diffuser, a fiber taper, one or more reflective surfaces, a polarizing reflective surface, a birefringent element, or any other suitable optical element that affects image light emitted from the display assembly.

The removable display 105 may be coupled and aligned with the pancake lens assembly 205 through a connecting interface 205 located on the eyewear device 115. The connecting interface 205 may provide power and/or information from the eyewear device 115 to the removable display 105, or from the removable display 105 to the eyewear device 115. In some examples, the connecting interface 205 provides a signal to the eyewear device 115 and/or any other device in a distributed artificial reality system 100 that indicates whether or not the removable display 105 is coupled to the eyewear device 115. In some embodiments, in response to the signal provided by the connecting interface 205, an optical power of the optical system 140 is adjusted.

The connecting interface 105 may include clips, magnets, or any other method that stabilizes and aligns the removable display 105 to the eyewear device 115. The removable display 105 may be located at a fixed distance from the pancake lens assembly 205, where the distance between them is determined by the connecting interface of the eyewear device 115. In other embodiments, the distance between the removable display 105 and the pancake lens assembly 205 may be at a variable distance from each other. In some examples, the length of the connecting interface 205 may be adjusted in response to the focal distance of the eye 210, as determined by an eye tracking system.

In some embodiments, the optical system 140 includes a pancake lens assembly. The pancake lens assembly may be a monolithic lens assembly, such that multiple optical elements are coupled together with an adhesive element. In other embodiments, the pancake lens assembly may have air gaps between any of the optical elements within the pancake lens assembly. One or more of the surfaces of the optical elements included in the pancake lens assembly may be shaped to correct for field curvature. For example, the one or more surfaces may be shaped to be spherically concave, spherically convex, a rotationally symmetric asphere, a freeform shape, or some other shape that mitigates field curvature. A pancake lens assemble to correct for field curvature and with large field of view (FOV) is described in further detail at, e.g., U.S. patent application Ser. No. 15/335,807, which is hereby incorporated by reference in its entirety. In some embodiments, any of the surfaces of the optical elements within the pancake lens assembly may have one or more coatings, such as an anti-reflective coating, to reduce ghost images and enhance contrast. The optical elements within the pancake lens assembly may be made from quartz, organic material sheets, liquid crystals, glass, or any other material capable of transmitting light from the removable display 105 to the eye 210. The optical elements within the pancake lens assembly may be any of a waveplate, a polarizer, a mirror, a lens, etc. capable of reflecting image light from the removable display 105 through multiple reflections within the pancake lens assembly. The optical elements within the pancake lens assembly may have field curvature of different radii and different indices of refraction, such that light reflected through the pancake lens assembly 205 minimizes the Petzval Sum. This may reduce distortion caused by field curvature. Additional details of the pancake lens assembly in the optical systems 140 are described in further detail at, e.g., U.S. patent application Ser. No. 15/624,439, U.S. patent application Ser. No. 15/179,883, which are hereby incorporated by reference in their entirety.

The pancake lens assembly 205 may be designed to maximize the transparency of the pancake lens assembly 205, such that if the removable display 105 is uncoupled from the eyewear device 115, the user is able to view his or her environment through the optical system 140. In some examples, the pancake lens assembly 205 may attenuate environmental light, such that the pancake lens assembly 205 in the optical systems 140 allow the eyewear device 115 to be used as a pair of sunglasses when the removable display 105 is uncoupled from the eyewear device 115.

If the removable display 105 is coupled to the eyewear device 115 through the connecting interface 205, the removable display 105 may be powered by a power source located on the eyewear device 115. In some examples, if the removable display 105 is coupled to the eyewear device 115 through the connecting interface 205, the removable display 105 is powered by a power source on the neckband 120 through the eyewear device 115, such that power from the neckband 120 is conveyed to the removable display 105 through the connector 150, the connecting interface 205 and the eyewear device 115. If the removable display 105 is coupled to the eyewear device 115, information from a computation compartment 170 may be conveyed to the removable display 105 through the connector 150, connecting interface 205, and eyewear device 115.

Figure 3:
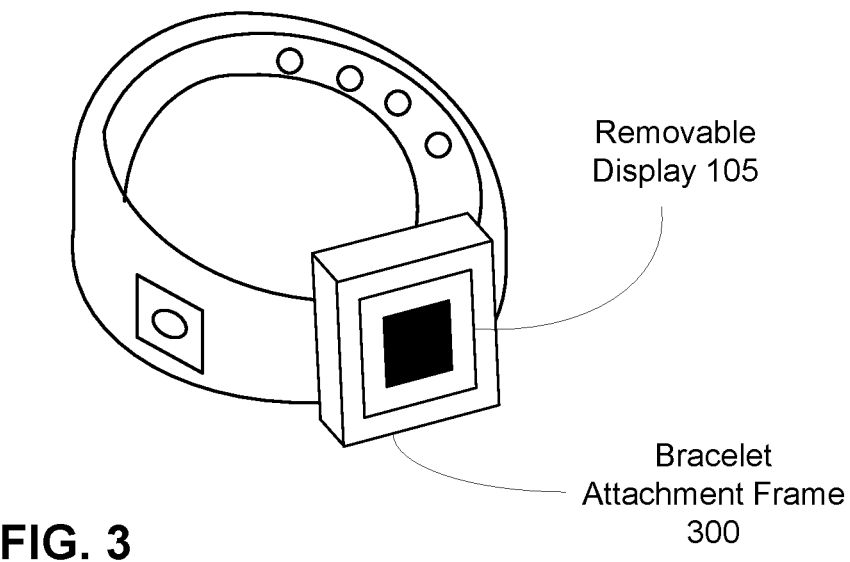
FIG. 3 is an illustration of a removable display interfacing with a bracelet, in accordance with one or more embodiments.

FIG. 3 is an illustration of a removable display 105 interfacing with a bracelet 110, in accordance with one or more embodiments. The removable display 105 is secured to the bracelet 110 by the bracelet attachment frame 300. The bracelet attachment frame 300 may include an interface for power and information coupling between the removable display 105 and the bracelet 110. If the removable display 105 is coupled to the bracelet 110, the removable display 105 may receive power from a power source located on the bracelet 110. Processing and computation for the removable display 105, such as rendering of the image projected by the removable display 105, may be done by a processor located on the bracelet 110. Additionally or alternatively, computation for the removable display 105 may be done by any other device in a distributed artificial reality system 100 and conveyed to the removable display 105 through the bracelet 110.

The bracelet attachment frame 300 may secure the removable display 105 to the bracelet 110 through clips, magnets, interlocking pieces, or any other physical attachment mechanism capable of connecting the removable display 105 to the bracelet attachment frame 300.

By coupling the removable display 105 to the bracelet 110 through the bracelet attachment frame 300, a user may be able to view a visual component of the artificial reality environment on his or her wrist. For example, the removable display 105 may provide a user with video content, with static pictures, with a message to a user, a time display, or any other visual content. In some examples, the bracelet 110 may be in signal communication with a mobile device, such as the mobile device 534 as described in FIG. 5. The removable display 105 may display a notification to a user from a mobile application on the mobile device. Additionally, coupling the bracelet 110 to the removable display 105 allows a user to view his or her environment through the eyewear device 115, such that the eyewear device 115 may be used as a pair of sunglasses.

Figure 4:
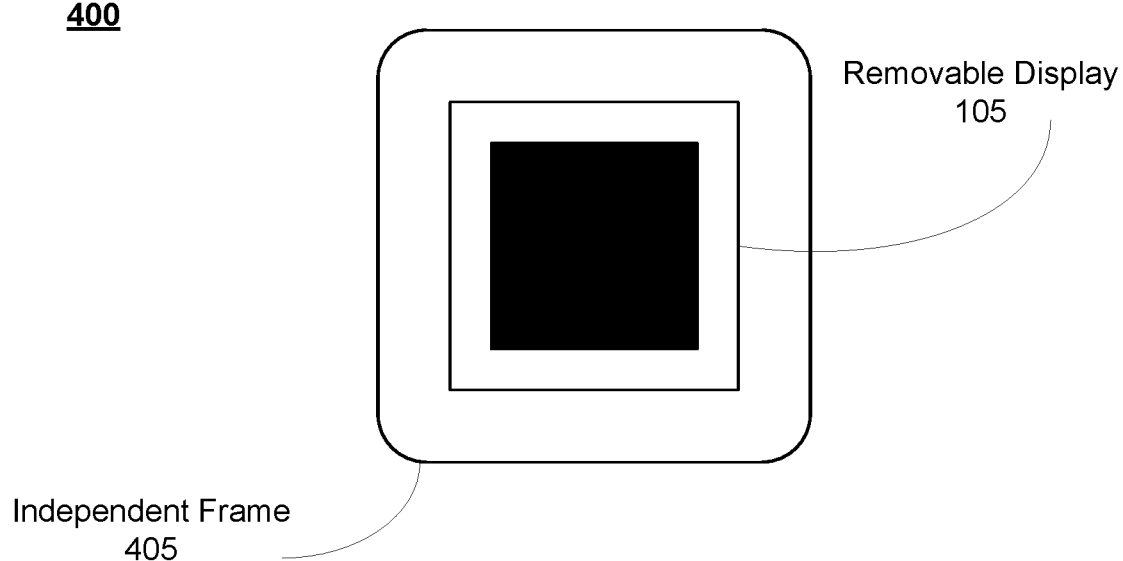
FIG. 4 is an illustration of a removable display interfacing with an independent frame, in accordance with one or more embodiments.

FIG. 4 is an illustration of a removable display 105 interfacing with an independent frame 405, in accordance with one or more embodiments. The independent frame 405 provides a support frame for the removable display 105, and allows the user to view visual content on the removable display 105. The independent frame 405 may include a power source, such that the power source of the independent frame 405 powers the removable display 105. The independent frame 405 may include a stand, such that the independent frame 405 stands up on a surface, allowing a user to view the removable display 105. In some examples, the independent frame 405 includes a wireless gateway, which may allow the removable display 105 to communicate with any other device in a distributed artificial reality system.

The independent frame 405 may secure the removable display 105 through clips, magnets, interlocking pieces, or any other physical attachment mechanism capable of connecting the removable display 105 to the independent frame 405.

By coupling the removable display 105 to the independent frame 405, a user may be able to view a visual component of the artificial reality environment on his or her wrist. For example, the removable display 105 may provide a user with video content, with static pictures, with a message to a user, a time display, or any other visual content. In some examples, the independent frame 405 may be in signal communication with a mobile device, such as the mobile device 534 as described in FIG. 5. The independent frame 405 may display a notification to a user from a mobile application on the mobile device. Additionally, coupling the removable display 105 to the independent frame 405 allows a user to view his or her environment through the eyewear device 115, such that the eyewear device 115 may be used as a pair of sunglasses.

Distributed Artificial Reality System

Figure 5:
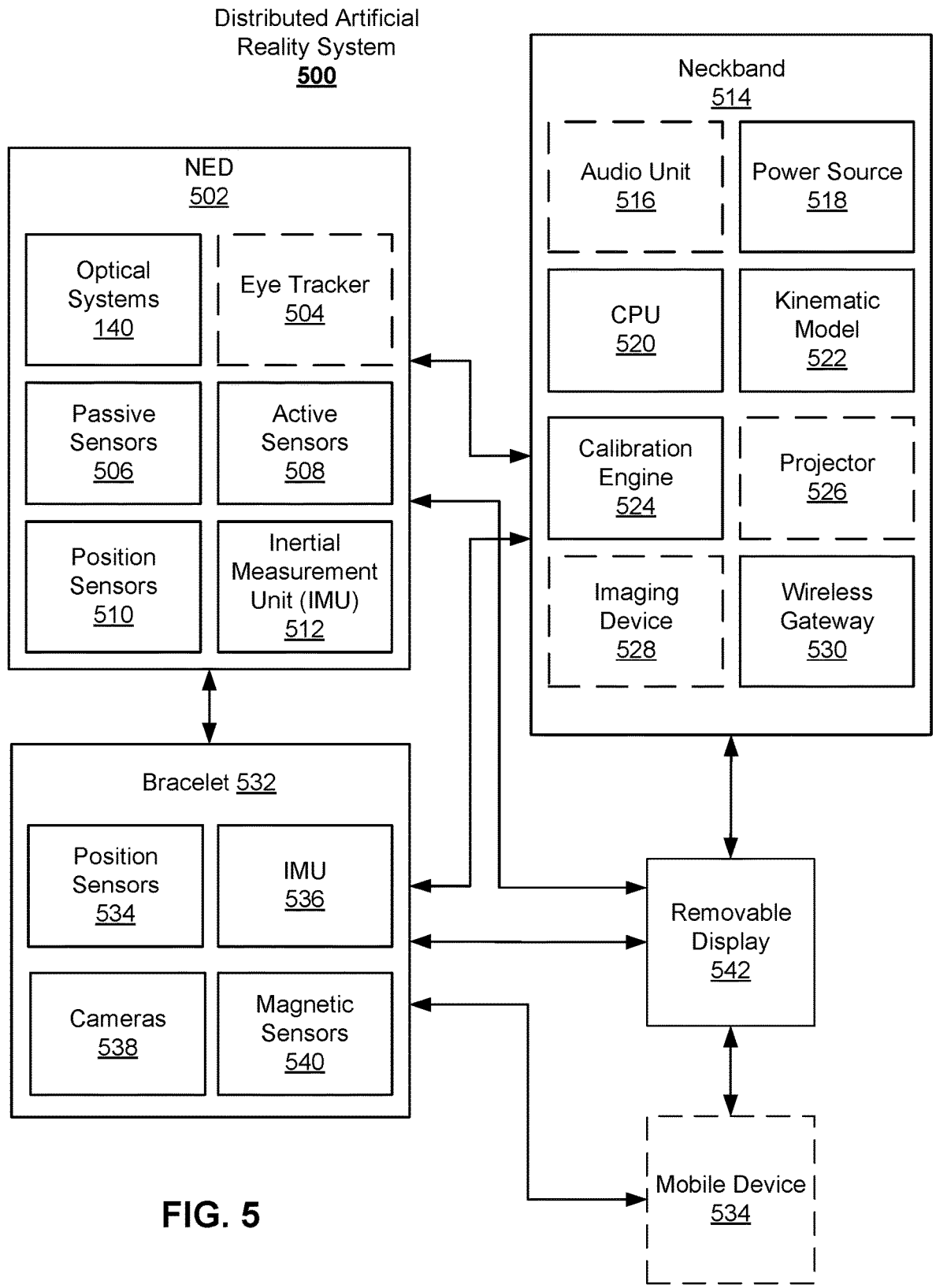
FIG. 5 is a block diagram of a distributed artificial reality system, in accordance with one or more embodiments.

FIG. 5 is a block diagram of a distributed artificial reality system 500, in accordance with one or more embodiments. The distributed artificial reality system 500 includes a bracelet 532, NED 502, a neckband 514, and an optional mobile device 534. The bracelet 532 is connected to the NED 502, neckband 514 and the optional mobile device 534. The bracelet 532 may be the bracelet 110 as described in FIGS. 1-2. The neckband 514 may be connected to the bracelet 532, the NED 502 and the optional mobile device 534. The neckband 514 may be the neckband 120 as described in FIG. 1. The NED 502 may be the eyewear device 115 as shown in FIGS. 1 and 2. In alternative configurations of system 500, different and/or additional components may be included. The system 500 may operate in a VR system environment, an AR system environment, an MR system environment, or some combination thereof.

The NED 502 includes optical systems 140, as described with reference to FIGS. 1-2. The NED 502 may also include an eye tracker 504, one or more passive sensors 506, one or more active sensors 508, one or more position sensors 510, and an Inertial Measurement Unit (IMU) 512. The eye tracker 504 may be an optional feature of the NED 502.

The eye tracker 504 tracks a user's eye movement. The eye tracker 504 may include at least a dichroic mirror, for reflecting light from an eye area towards a first position, and a camera at the position at which the light is reflected for capturing images. Based on the detected eye movement, the eye tracker 504 may communicate with the bracelet 532, neckband 514, CPU 520 and/or optional mobile device 534 for further processing. Eye tracking information collected by the eye tracker 504 and processed by the CPU 520 of the neckband 514 and/or optional mobile device 534 may be used for a variety of display and interaction applications. The various applications include, but are not limited to, providing user interfaces (e.g., gaze-based selection), attention estimation (e.g., for user safety), gaze-contingent display modes (e.g., foveated rendering, varifocal optics, adaptive optical distortion correction, synthetic depth of field rendering), metric scaling for depth and parallax correction, etc. In some embodiments, a processor in the optional mobile device 534 may also provide computation for the eye tracker 504.

Passive sensors 506 may be cameras. Passive sensors may also be locators, which are objects located in specific positions on the NED 502 relative to one another and relative to a specific reference point on the NED 502. A locator may be a corner cube reflector, a reflective marker, a type of light source that contrasts with an environment in which the NED 502 operates, or some combination thereof. In embodiments in which the locators are active sensors 508 (i.e., an LED or other type of light emitting device), the locators may emit light in the visible band (~370 nm to 750 nm), in the infrared (IR) band (~750 nm to 1700 nm), in the ultraviolet band (300 nm to 380 nm), some other portion of the electromagnetic spectrum, or some combination thereof.

Based on the one or more measurement signals from the one or more position sensors 510, the IMU 512 generates IMU tracking data indicating an estimated position of the NED 502 relative to an initial position of the NED 502. For example, the position sensors 510 include multiple accelerometers to measure translational motion (forward/back, up/down, left/right) and multiple gyroscopes to measure rotational motion (e.g., pitch, yaw, and roll). In some embodiments, the IMU 512 rapidly samples the measurement signals and calculates the estimated position of the NED 502 from the sampled data. For example, the IMU 512 integrates the measurement signals received from the accelerometers over time to estimate a velocity vector and integrates the velocity vector over time to determine an estimated position of a reference point of the NED 502. Alternatively, the IMU 512 provides the sampled measurement signals to the neckband 514 and/or the optional mobile device 534 to process the computation required to estimate the velocity vector and the estimated position of the NED 502.

The IMU 512 may receive one or more calibration parameters from the bracelet 532, neckband 514 and/or the optional mobile device 534. The one or more calibration parameters are used to maintain tracking of the NED 502. Based on a received calibration parameter, the IMU 512 may adjust one or more IMU parameters (e.g., sample rate). The adjustment may be determined by the CPU 520 of the neckband 514, or a processor of the optional mobile device 534. In some embodiments, certain calibration parameters cause the IMU 512 to update an initial position of the reference point so it corresponds to a next calibrated position of the reference point. Updating the initial position of the reference point at the next calibrated position of the reference point helps reduce accumulated error associated with the determined estimated position of the NED 502. The accumulated error, also referred to as drift error, causes the estimated position of the reference point to "drift" away from the actual position of the reference point over time. In some examples, the IMU 512 is located in the neckband 514 or an IMU is present in both the neckband 514 and NED 502. In some examples, the IMU 512 receives position information from both position sensors 510 on the NED 502, positions sensors 538 on the bracelet 532 and position sensors 510 on the neckband (not shown).

As shown in FIG. 5, the neckband 514 includes an imaging device 528, power source 518, a CPU 520, a projector 526, user vitals monitor 528, a wireless gateway 530, imaging device 528 and activator 532. The audio unit 516, projector 526, user vitals monitor 528, and imaging device 528 are optional components of the neckband 514. In some embodiments, the neckband 514 includes one or more multifunctional compartments that interface with various functional units. The functional units can include, e.g., an additional power source, an additional processing unit (e.g., CPU), the projector 526, and the wireless gateway 530.

The imaging device 528 is optionally located on the neckband 514. In other embodiments of the system 500, the imaging device 528 may be located on the optional mobile device 534 or NED 502. The imaging device 528 may be a DCA, which collects information about a user's local environment. The imagining device 528 may be located on either the eyewear device 110 and/or the neckband 115. The imaging device 528 includes one or more sources and one or more light sensors (e.g., a camera, a video camera). The light source illuminates a local environment of a user, which allows the imaging device 528 to detect the presence of objects in the local environment. The bracelet 532 tracks a user's hand and determines a hand gesture with respect to the local environment and any of the detected objects in the local environment. As referred to herein, a hand gesture may also be referred to as a pose of a user's hand, a position of a user's hand, or a hand movement.

The imaging device 528 emits a waveform into the local environment. The wavelength of the waveform may be in a visible band (~380 nm to 750 nm), an infrared (IR) band (~750 nm to 1500 nm), an ultraviolet band (10 nm to 380 nm), another portion of the electromagnetic spectrum, or some combination thereof. The light sensors may be sensitive to the same range of wavelengths emitted as the waveform. The light sensors may also be sensitive to light having visible wavelengths as well as the light emitted as the waveform. For example, the light sensors may be red, green, blue, IR (RGBI) cameras. In some embodiments, the light sensors may be a camera in addition to a complementary metal-oxide-semiconductor (CMOS) imager, other light sensitive device, or some combination thereof.

The light sensors of the imaging device 528 detect the presence of objects in the local environment. For example, the waveform emitted into the local environment reflects off of the objects. In addition to the reflected waveform, the objects reflect incident ambient light that may be collected by the light sensors of the imaging device 528. The reflected ambient and waveform light is collected by the light sensors and compared to the emitted waveform to determine characteristics of the objects, such as the distance of the objects from the imaging device 528, the shape of the objects, the surface texture of the objects, etc. In some examples, the waveform is structured light (SL), which may be in any SL pattern, such as a symmetric or quasi dot pattern, grid, horizontal bars, etc. The imaging device 528 compares the emitted SL to the structure of the reflected light to detect the characteristics of the objects. In some embodiments, the imaging device 528 may use Time of Flight (ToF) depth determination techniques in which, e.g., the characteristics of the objects are determined from a time delay between the emitted waveform and a detected reflection of a portion of the waveform off of the objects. In some embodiments, the imaging device 528 may use stereo imaging techniques, in which the characteristics of the objects are determined through a stereo image. Additionally, in some embodiments, one or more depth determination techniques may be combined to determine depth information for the objects in the local environment. Any other depth sensing may be used by the imaging device 528 to determine the characteristics of the objects and/or a hand of the user. In some embodiments, the imaging device 528 does an initial scan of waveform in the local environment to detect the objects, and then selectively emits a second set of waveform localized around the detected objects.

The imaging device 528 conveys the collected information about the objects and conveys them to a processor of a distributed artificial reality system, such as a processor in the computation compartment 170 of the neckband 115, the processor of a mobile device, such as optional mobile device 534, or any other processor in any other device in the distributed artificial reality system. The processor also receives a number of visual signals from the camera 130, position signals from the position sensor 125, orientation signals from the magnetic sensors 135, or any other signals from a bracelet 532 that together may indicate a hand gesture. The processor determines the hand gesture from any of the signals received from the bracelet 532. The imaging device 528 is thus communicatively coupled to a processor in a distributed artificial reality system, which may be through any wired or wireless signal.

The processor combines information about the objects located in the local environment as determined by the imaging device 528 with the hand gesture. The hand gesture is determined by the processor from sensor information conveyed to the processor from sensors located on the bracelet 532. In some instances the information about the objects located in the local environment may also include depth information about one or more of the user's hands. The processor may determine if the hand gesture refers to any of the objects detected in the local environment. For example, the processor may determine if a hand gesture indicates the user's interaction with the objects, such as if the hand gesture is pointing at an object in the local environment. The processor thus interprets the user's hand gesture as determined by the processor from sensor information provided by any number of sensors located on the bracelet 532 within the context of the local environment as determined by the imaging device 528. In some examples, the processor uses information about the objects located in the local environment to determine a hand gesture. The processor may combine signals received from the bracelet 532 with information about objects received from the imaging device 528 to determine a hand gesture. For example, if the sensors on the bracelet 532 indicate that the bracelet 532 is aligned with an object detected by the imaging device 5281, the processor may use this information to determine that the user is pointing at the object, and thus that the hand gesture is a pointing hand gesture.

In response to relating the hand gesture to the detected objects, the processor may adjust the artificial reality provided to the user through any of the removable display 542, bracelet 532, eyewear device 110 and/or neckband 115. For example, if the processor determines that the hand gesture is pointing at an object, it may instruct the removable display 542 to display information to a user about the object. For example, if the object is a book that the hand gesture is pointing at, then the removable display 542 may display to a user recent reviews about the book, books by the same author, a preview of the book, etc.

The power source 518 provides power to the eye tracker 504, passive sensors 506, active sensors 508, position sensors 510 and IMU 512. The power source 518 may be the battery compartment 155 as shown in FIG. 1. Power source 518 may be a rechargeable battery, which may be recharged by the optional mobile device 534. The power source 518 may be turned ON or OFF in response to a command received by the optional mobile device 534. In some examples, the power source 518 provides power to any of the other devices in the distributed artificial reality system 500, such as the removable display 542.

The CPU 520 may be any standard processor, and may be the processor embedded in the computation compartment 170 as shown in FIG. 1. The CPU 520 may provide all computational processing for the bracelet 532 and the NED 502, including the computation associated with the position sensors 538, IMU 540, cameras 542, magnetic sensors 544, eye tracker 504, passive sensors 506, active sensors 508, IMU 512. The CPU 520 may carry out calculations in parallel with the processor of the optional mobile device 534. A processor in the optional mobile device 534 may provide calculation results to the CPU 520.

The projector 526 may be located on the neckband 514 to project visual information to a user. The projector 526 may project visual information onto a surface in the user's field of view, or onto a coupled device with a screen, such as the optional mobile device 534.

The wireless gateway 530 provides signal communication with the removable display 542, optional mobile device 534, bracelet 532 and/or the NED 502. The wireless gateway 530 may be any standard wireless signal gateway, such as a BLUETOOTH gateway, Wi-Fi gateway, etc.

The bracelet 532 includes position sensors 538, an IMU 540, cameras 542 and magnetic sensors 544. The bracelet 532 may include any additional passive or active sensors. The position sensors 538 produce signals in response to movement of the bracelet 532. In some examples, the position sensors 538 indicate a relative position between the bracelet 532 and any of the NED 502, neckband 514 and/or optional mobile device 534. The position sensors 538 may be the position sensor 125 and are described in further detail with respect to FIG. 1. The IMU 540 determines a position of the bracelet 532 using the signals produced by the position sensors 538. The IMU 540 is also described with respect to FIG. 1. The cameras 542 collect visual information about a user's hand to determine a user's hand gesture, such as hand gesture. The cameras 542 may be the camera 130, and are described in further detail with respect to FIG. 1. The magnetic sensors 544 produce a signal indicating the direction of a background magnetic field. Movement of the bracelet 532 produces a change in the relative position of the magnetic sensors 544 with respect to the magnetic field which can be used to determine a movement of the bracelet 110. Magnetic sensors 544 may be the magnetic sensors 135 and are described in further detail with respect to FIG. 1.

The removable display 542 may be coupled to any of the other devices in the distributed artificial reality system 500, such as the NED 502, neckband 514, bracelet 532 and/or optional mobile device 534. The removable display 542 may be in signal communication with any of the other devices in the distributed artificial reality system 500. The signal communication may be any signal capable of conveying wireless information, such as a BLUETOOTH gateway, Wi-Fi gateway, etc.

The distributed artificial reality system 500 produces an artificial reality environment to a user, or any combination thereof. The distributed artificial reality system 500 is able to distribute processing, power and heat generating functions across the removable display 542, the bracelet 532, the NED 502, neckband 514 and optional mobile device 534. This allows each of bracelet 532, the NED 502 and neckband 514 to be adjusted to the desired weight and temperature for user comfort, as well as providing varied virtual environment interfaces and functions for the user to interact with at any of the bracelet 532, the NED 502, neckband 514 and/or optional mobile device 534. Additionally, the removable display 542 allows a visual component of the artificial reality to be moved off of the NED 502 and coupled to any of the other devices in the distributed artificial reality system 500.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
   an eyewear device including an eye tracker and a lens assembly with an adjustable optical power, the lens assembly configured to direct light to an eye of a user;
   a neckband device comprising a first power source and a processor communicatively coupled to the eyewear device, the processor powered by the first power source; and
   a display device configured to:
      present content to the user, and
      couple to and be removable from the eyewear device via a coupling that provides a signal to the eyewear device and the processor indicating whether the display device is coupled to the eyewear device, the display device being powered by the first power source when the display device is coupled to the eyewear device and by a second power source when the display device is uncoupled from the eyewear device, wherein
   the eye tracker is configured to:
      convey information about a focal distance of the user to the processor when the display device is coupled to the eyewear device, and
      convey the information about the focal distance to the lens assembly when the display device is uncoupled from the eyewear device,
   the processor is configured to instruct, based on the conveyed information, the display device to emit image light in focus for the user when the display device is coupled to the eyewear device, and
   the lens assembly is further configured to adjust the optical power based on the conveyed information when the display device is uncoupled from the eyewear device.

2. The system of claim 1, wherein the eyewear device further comprises a pancake lens assembly configured to be semi-transparent to incident light on the eyewear device.

3. The system of claim 2, wherein the display device projects the image light, and is further configured to couple to the eyewear device such that the pancake lens assembly is aligned with the display device, and the projected image light is reflected through the pancake lens assembly.

4. The system of claim 2, wherein the pancake lens assembly is a monolithic assembly, and is configured to reduce a field curvature.

5. The system of claim 1, further comprising a bracelet device including at least one sensor configured to determine a position signal in response to movement of a user's hand, the bracelet device communicatively coupled to the processor further configured to determine a hand gesture based in part on the position signal.

6. The system of claim 5, wherein the display device is further configured to change content presented to the user in response to the hand gesture.

7. The system of claim 5, wherein the display device is further configured to couple to and be removable from the bracelet device.

8. The system of claim 1, further comprising:
   a frame comprising a third power source, and wherein the display device is further configured to couple to and be removable from the frame, and the third power source provides power to the display device while the display device is coupled to the frame.

9. The system of claim 1, wherein the processor is further configured to calculate an image-rendering based in part on the conveyed information, and the display device is further configured to project the image light based on the image-rendering received from the processor.

10. An eyewear device comprising:
    a lens assembly with an adjustable optical power, the lens assembly configured to direct light to an eye of a user;
    a neckband device comprising a first power source and a processor communicatively coupled to the eyewear device, the processor powered by the first power source;
    a display device configured to:
       present content to the user, and
       couple to and be removable from the eyewear device via a coupling that provides a signal to the eyewear device and the processor indicating whether the display device is coupled to the eyewear device, the display device being powered by the first power source when the display device is coupled to the eyewear device and by a second power source when the display device is uncoupled from the eyewear device; and
    an eye tracker configured to:
       convey information about a focal distance of the user to the processor when the display device is coupled to the eyewear device, and
       convey information about the focal distance to the lens assembly to adjust the optical power when the display device is removed from the eyewear device, wherein
    the processor is configured to instruct, based on the conveyed information, the display device to emit image light in focus for the user when the display device is coupled to the eyewear device, and
    the lens assembly is further configured to adjust the optical power based on the conveyed information when the display device is uncoupled from the eyewear device.

11. The eyewear device of claim 10, wherein the eyewear device further comprises a pancake lens assembly configured to be semi-transparent to incident light on the eyewear device.

12. The eyewear device of claim 11, wherein the display device projects the image light, and is further configured to couple to the eyewear device such that the pancake lens assembly is aligned with the display device, and the projected image light is reflected through the pancake lens assembly.

13. The eyewear device of claim 11, wherein the pancake lens assembly is a monolithic assembly, and is configured to reduce a field curvature.

14. The eyewear device of claim 10, further comprising a bracelet device including at least one sensor configured to determine a position signal in response to movement of a user's hand, the bracelet device communicatively coupled to the processor further configured to determine a hand gesture based in part on the position signal.

15. The eyewear device of claim 14, wherein the display device is further configured to change content presented to the user in response to the hand gesture.

16. The eyewear device of claim 14, wherein the display device is further configured to couple to and be removable from the bracelet device.

17. The eyewear device of claim 10, further comprising:
a frame comprising a third power source, and wherein the display device is further configured to couple to and be removable from the frame, and the third power source provides power to the display device while the display device is coupled to the frame.

18. The eyewear device of claim 10, wherein the processor is further configured to calculate an image-rendering based in part on the conveyed information, and the display device is further configured to project the image light based on the image-rendering received from the processor.

* * * * *